(12) United States Patent
Chen

(10) Patent No.: US 12,365,227 B2
(45) Date of Patent: Jul. 22, 2025

(54) VEHICLE PROTECTOR

(71) Applicant: David Chen, Milford, CT (US)

(72) Inventor: David Chen, Milford, CT (US)

(*) Notice: Subject to any disclaimer, the term of this patent is extended or adjusted under 35 U.S.C. 154(b) by 625 days.

(21) Appl. No.: 16/569,698

(22) Filed: Sep. 13, 2019

(65) Prior Publication Data
US 2021/0078395 A1 Mar. 18, 2021

(51) Int. Cl.
B60J 11/06 (2006.01)
(52) U.S. Cl.
CPC .................. B60J 11/06 (2013.01)
(58) Field of Classification Search
CPC ....................................... B60J 11/06
USPC ........................................ 150/166
See application file for complete search history.

(56) References Cited

U.S. PATENT DOCUMENTS

| | | | | |
|---|---|---|---|---|
| 2,639,751 A * | 5/1953 | Flaherty | ......... | B60J 11/00 296/136.03 |
| 2,643,711 A * | 6/1953 | Smith | ......... | B60J 1/2011 160/371 |
| 2,646,097 A * | 7/1953 | Gaverth | ......... | B60J 11/02 248/228.5 |
| 4,216,989 A * | 8/1980 | Tackett | ......... | B60J 11/00 296/136.04 |
| 4,849,272 A * | 7/1989 | Haney | ......... | B25H 5/00 428/102 |
| 5,497,819 A * | 3/1996 | Chiang | ......... | B60J 11/00 296/136.01 |
| 6,318,426 B1 * | 11/2001 | Thomas | ......... | B60J 11/00 160/370.21 |
| 7,360,820 B2 * | 4/2008 | Tellez | ......... | B60J 11/00 296/136.13 |
| 8,061,761 B1 * | 11/2011 | Sierra | ......... | G09F 21/048 296/136.01 |
| 8,070,211 B2 * | 12/2011 | Suh | ......... | B60J 11/00 296/136.12 |
| 2015/0258880 A1 * | 9/2015 | Wheeler | ......... | B60J 11/06 293/127 |
| 2017/0259655 A1 * | 9/2017 | Dylewski, II | ......... | B60J 7/141 |

OTHER PUBLICATIONS

Merriam Webster Dictionary for Telescope—https://www.merriam-webster.com/dictionary/telescope (Year: 2022).*

* cited by examiner

Primary Examiner — Nathan J Jenness
Assistant Examiner — Jessica Kavini Tamil
(74) Attorney, Agent, or Firm — IP Attorneys Group, LLC

(57) ABSTRACT

A vehicle protector is described. In some embodiments the vehicle protector comprises an outer frame and an interior section. In some embodiments the outer frame and interior section are each one piece, in other embodiments they are both made of multiple pieces, and in another embodiment either the outer frame or interior section are made of multiple pieces. In some embodiments the outer frame and interior section are equipped with fasteners which join the areas together. In other embodiments the outer frame pieces are equipped with fasteners which join them together and in other embodiments the interior section pieces are equipped with fasteners which join them together. In some embodiments the bottom surface comprises features to raise the vehicle protector off of the vehicle. In some embodiments the vehicle protector comprises a lock which secures the sections together to reduce the potential for theft.

6 Claims, 6 Drawing Sheets

VEHICLE PROTECTOR

BACKGROUND OF THE INVENTION

The present invention relates to a device that protects the external features of a vehicle from scratches or dents.

Typically, when bikes or other larger objects are transported by vehicles, they are directly strapped to the roof of the vehicle, strapped to racks secured to the roof of the vehicle, racks secured to the trunk of the vehicle, or racks added to the trailer hitch. Often the pedals of the bike or protrusions from other objects interact with the surface of the vehicle and scratch or dent the vehicle while transporting the object. These dents and scratches can be costly to fix, especially if rust or paint bubbling begins to form where water seeps below the scratched paint layer. Sometimes users apply protective films or paints to keep the objects from scratching the vehicle, however, this can be a costly temporary barrier and does little to protect against dents. Other users sometimes use blankets or other padded material, but these need to be secured to the car and can be a hassle to remove and install between use. Blankets also are typically a defined shape and size and often cannot be modified to the size of the vehicle. Thus, often license plates, brake lights, backup cameras, or other important features of the vehicle get covered using these methods, which can be a safety hazard.

Similarly, when parked in a public lot or other places, individuals in vehicles parked next to the owner's vehicle can dent the owner's vehicle when carelessly opening their vehicle door or with shopping carts. Sometimes vehicle owners will put magnetic door protectors which cover the area most effected by other vehicle's doors, however these are typically a single size and not adjustable or foldable for easy movement and storage. Additionally, water can get trapped in-between the vehicle and magnetic protector and cause damage to the exterior of the vehicle.

Thus, what is needed is a vehicle protector which is modular and can protect various parts of a vehicle while not covering other parts or essential items of the vehicle. Ideally, this vehicle protector should be easily assembled and disassembled, and foldable such that it can be easily stored. The protector should also not trap water between the protector and vehicle exterior.

SUMMARY OF THE INVENTION

The present invention relates to a device that protects the external features of a vehicle from scratches or dents. In some embodiments the vehicle protector comprises an outer frame which has an inner perimeter and an interior section with an outer perimeter. In some embodiments, the interior section is all one piece, and in other embodiments there are multiple interior section pieces. Similarly, in some embodiments the outer frame is all one piece and in other embodiments there are multiple outer frame pieces. In some embodiments the different outer frame pieces are telescopically engaged with one another.

In many embodiments, the inner perimeter of the outer frame and the outer perimeter of the interior section each comprise at least one fastener which mate with one another. In some embodiments there are fasteners on more than one of the interior section pieces which mate with one another and in other embodiments there are fasteners on more than one of the outer frame pieces which mate with one another. In most embodiments, the fasteners are selected from the group consisting of magnetization, hole and projection, groove and projection, hook and loop, and combinations thereof. In most embodiments each interior section fastener can mate with any outer frame fastener and similarly each outer frame fastener can mate with any interior section fastener.

In some embodiments, the bottom surface of the vehicle protector is equipped with features which allow air or water to flow behind the vehicle protector which are selected from the group consisting of projections, corrugation, bumps, ridges, divots, and combinations thereof. In some embodiments, there are one or more magnets within these features. In other embodiments the bottom surface is a magnet.

In some embodiments, the vehicle cover comprises at least one fold line which helps for storage of the device. In other embodiments, the vehicle protector is made of a flexible material which can be bent to a desired shape. In other embodiments the vehicle protector is made of a generally rigid material which maintains its shape. The shape of the vehicle protector and the interior section is selected from the group consisting of circle, triangle, square, rectangle, pentagon, hexagon, heptagon, octagon, nonagon, decagon, polygon, and combinations thereof.

In some embodiments, the vehicle cover further comprises a lock which secures the vehicle cover pieces together or secures the cover to the vehicle. In some embodiments the lock in a deadbolt system and in others it is a strap. In some embodiments the one or more interior section pieces are provided with a removing aid which helps remove the pieces from the vehicle. These removing aids are selected from the group consisting of handle, tab, extra fabric, ejection spring, or combinations thereof.

DETAILED DESCRIPTION OF THE INVENTION

Figure 1:
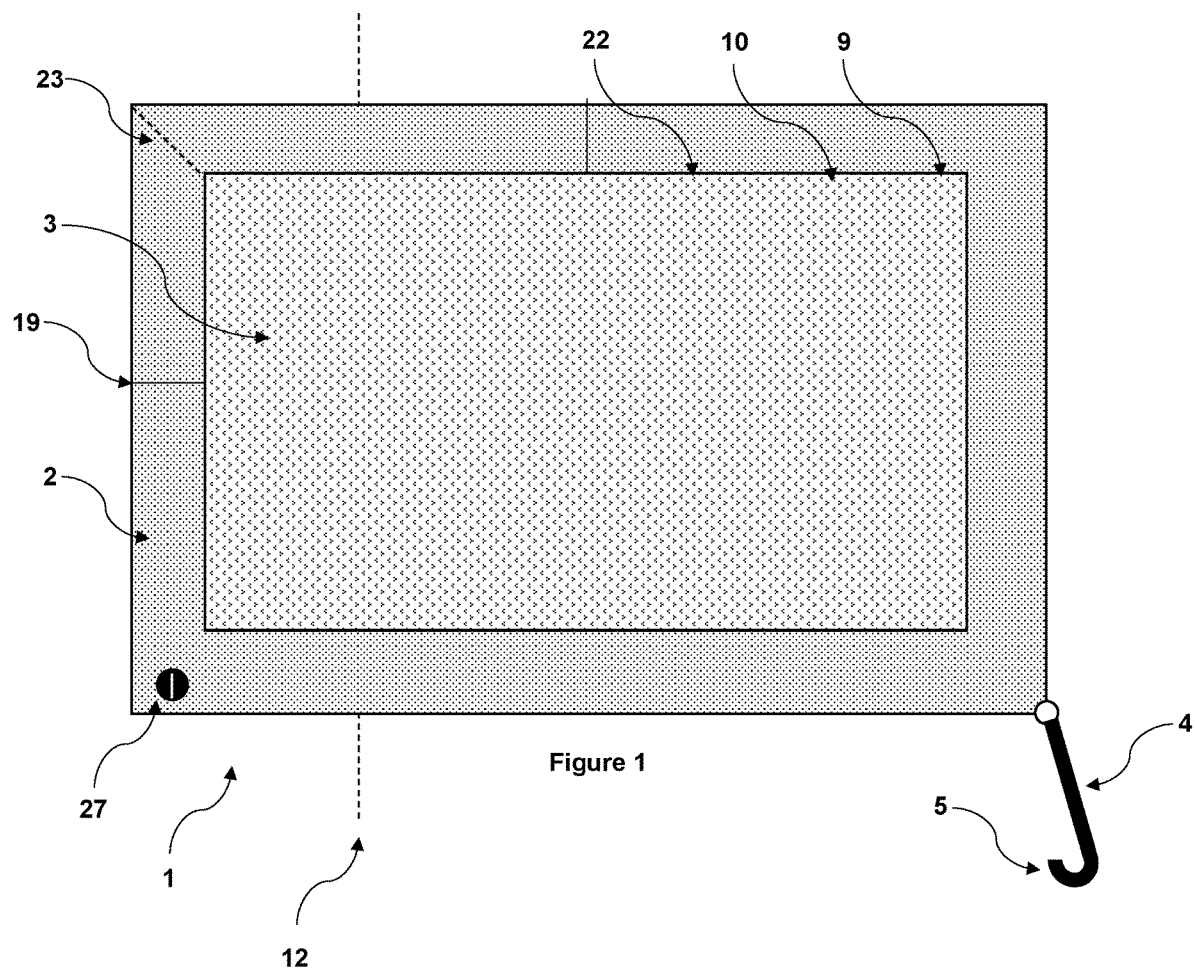
FIG. 1 shows a front view of a vehicle protector in accordance with the present invention.
Figure 2:
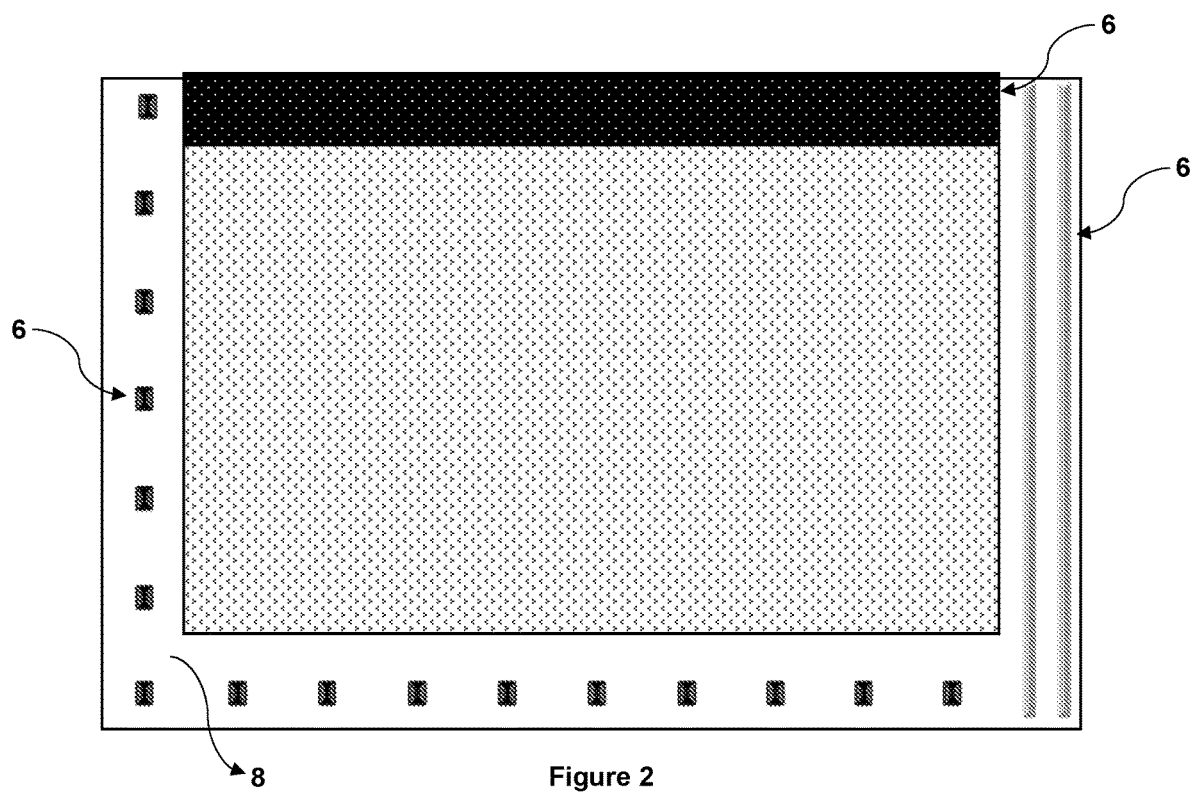
FIG. 2 shows a rear view of the vehicle protector of FIG. 1.
Figure 3:
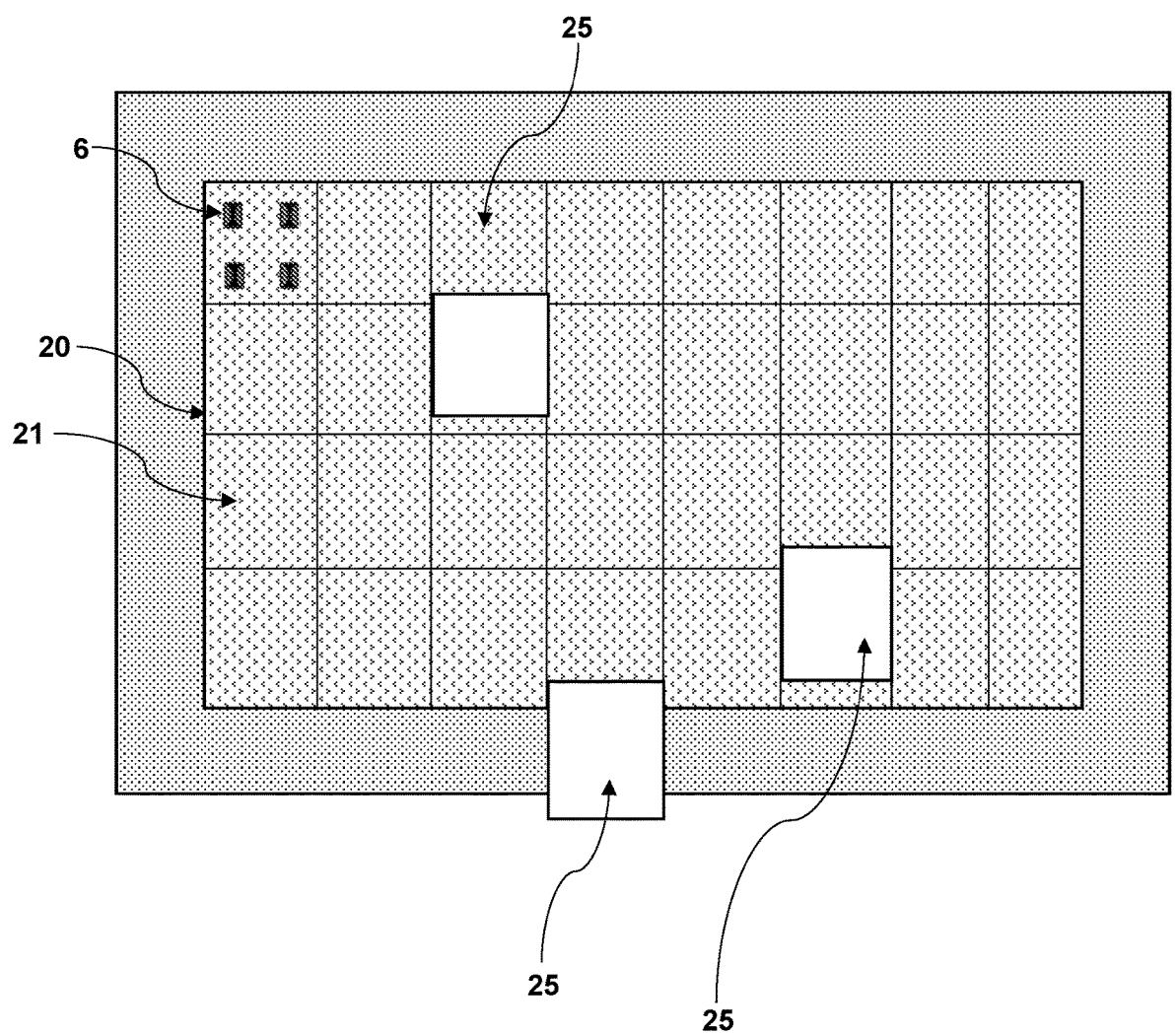
FIG. 3 shows a rear view of another embodiment of the invention as the one shown in FIG. 1.

FIG. 1 shows a front view of one embodiment of a vehicle protector (1). Generally, vehicle protector 1 has an outer surface (7) which faces away from the vehicle when vehicle protector 1 is attached to the vehicle, and an inner surface (8) which faces the vehicle when vehicle protector 1 is attached to the vehicle. In the embodiment shown in FIG. 1, vehicle protector 1 comprises outer frame 2 and interior section 3. In some embodiments, outer frame 2 is a single piece, and in other embodiments outer frame 2 is made of multiple pieces. Embodiments where outer frame 2 is a single piece are important as this construction gives greater stability to outer frame 2 and lessens the potential that a section of outer frame 2 would be misplaced or stolen. Embodiments where outer frame 2 is made of multiple pieces are valuable as it gives the user the ability to customize the frame size and shape to fit the current needs of the user. Similarly, in some embodiments interior section 3 is a single piece, and in other embodiments interior section 3 is made up multiple pieces, as seen in FIG. 3. Embodiments where interior section 3 is a single piece are important as this construction gives greater stability to interior section 3 and lessens the potential that a section of interior section 3 would be misplaced or stolen. Embodiments where interior section 3 is made of multiple pieces are valuable as it gives the user the ability to customize the frame size and shape to fit the current needs of the user.

In many embodiments, vehicle protector 1 is removably attachable. In some embodiments straps (4) are added to outer frame 2 which attach outer frame 2 to the vehicle. In other embodiments straps 4 are added to interior section 3. In some embodiments straps 4 have no hook on the end, and in other embodiments straps 4 are further equipped with hook 5. The hook shape and style is varied in different embodiments is are selected from the group consisting of simple hook, carabiner hook, snap hook, "s" hook, swivel hook, hook eye, or combinations thereof.

In other embodiments, outer frame 2 and interior section 3 are provided with magnets to attach the sections to the vehicle. In some embodiments with attaching magnets, the strength of each individual magnet is between 1 and 25 Gauss, in other embodiments between 25 and 50 Gauss, in other embodiments between 50 and 100 Gauss, and in other embodiments over 100 Gauss. The strength of the magnet combined with the number of magnets determine how well vehicle protector 1 attaches to the vehicle and conversely how easy vehicle protector 1 can be removed. The balance of security and ease of removal is important as vehicle protector 1 should not fall off during transport due to too few or too weak of magnets, but should also be able to be removed by the user after use and not be permanently affixed to the vehicle due to too many or too strong of magnets, which is why each range of magnet strengths are important. Additionally, the strength of the magnet typically affects its cost, with stronger magnets having a higher cost. Some embodiments with a plurality of magnets match well with each individual magnet having a relatively low strength of 1-25 Gauss. These embodiments use lower cost magnets but are required to use a greater number per device. On the opposite end, in some embodiments when only 1 or a few magnets are used, each magnet needs to have a relatively high strength of over 100 Gauss. These embodiments use higher cost magnets but a limited number of magnets per device. Magnets whose strength is between 25 and 50 Gauss and between 50 and 100 Gauss are important for balancing cost and the number of magnets which can optimally fit on a given section of vehicle protector 1.

In some embodiments vehicle protector 1 is a single layer and in other embodiments vehicle protector 1 is multiple layers. In some embodiments with multiple layers all of the layers have about the same material composition, and in other embodiments the layers have different material compositions.

In some embodiments, outer surface 7 is made of a durable or shock-resistant material designed to protect the vehicle from scratches or dents. Examples of durable or shock-resistant materials include plastic, rubber, metal, cloth, leather, wood, or combinations thereof. In some embodiments, inner surface 8 is made of a softer material which will not scratch the vehicle when vehicle protector 1 is attached to the vehicle. Examples of softer material include rubber, cloth, leather, and combinations thereof. In some embodiments inner surface 8 is magnetic. In other embodiments a magnetic layer is placed under a softer inner surface 8.

In some embodiments inner surface 8 is further equipped with features (6) that raise vehicle protector 1 off of the surface of the vehicle to allow water and air to pass through. Features 6 include projections, corrugation, ridges, bumps, divots, and combinations thereof. Features 6 are important as they keep water from being trapped under vehicle protector 1 and damaging the paint or rusting the metal exterior of the vehicle. In some embodiments one or more magnets are placed within features 6, and in other embodiments one or more magnets are placed below features 6 on inner surface 8.

In some embodiments vehicle protector 1 is equipped with fastener 11. In some embodiments the entire inner perimeter 9 of outer frame 2 is equipped with fastener 11, in other embodiments only one section of inner perimeter 9 is equipped with fastener 11, and in other embodiments multiple sections of inner perimeter 9 are equipped with fastener 11. Mating with this fastener at seam 22 is fastener 11 located on the outer perimeter 10 of interior section 3. In some embodiments the entire outer perimeter 10 is equipped with fastener 11, in other embodiments only one section of outer perimeter 10 is equipped with fastener 11, and in other embodiments multiple sections of outer perimeter 10 are equipped with fastener 11. Fastener 11 is selected from the group consisting of magnetization, hole and projection, groove and projection, hook and loop, and combinations thereof.

Figure 4A:
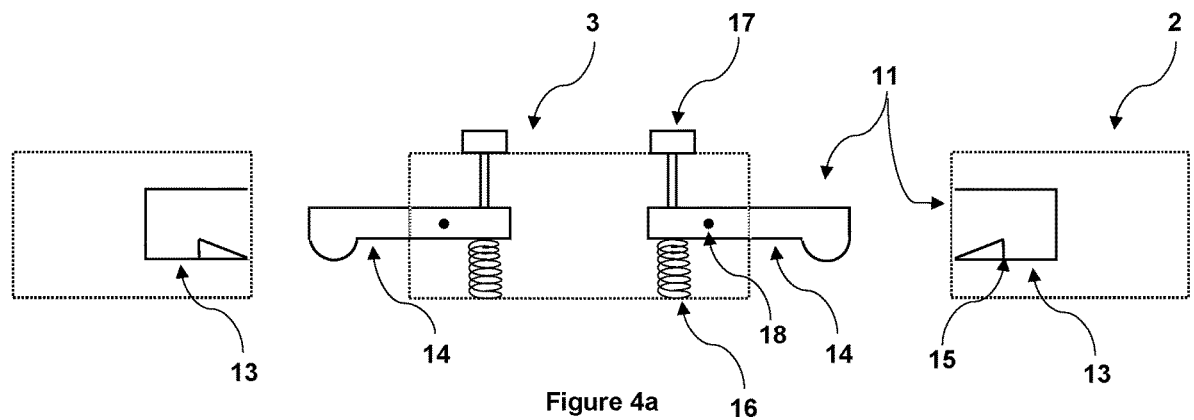
FIG. 4a shows a disassembled cross-sectional view of the embodiment of the vehicle protector shown in FIG. 1.
Figure 4B:
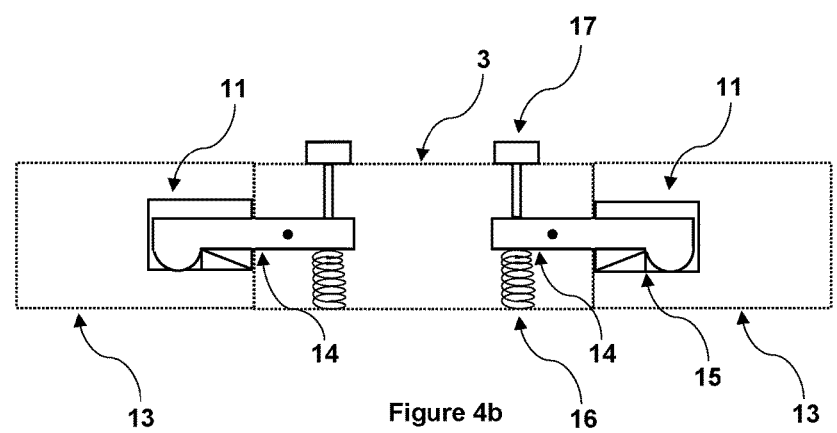
FIG. 4b shows an assembled cross-sectional view of the embodiment of the vehicle protector shown in FIG. 1.

FIG. 4a is a disassembled cross-sectional view cut along dashed line 12 of FIG. 1, and FIG. 4b shows an assembled cross-sectional view cut along dashed line 12 of FIG. 1. These figures show a close-up view of an example of one type of fastener 11, the hole and projection. In this example, outer frame 2 is equipped with the hole 13 and interior section is equipped with projection 14. In this embodiment projection 14 inserts into hole 13 and gets caught by trap 15, as seen in FIG. 4b. Spring 16 keeps projection 14 from lifting out of trap 15. When ready to release, button 17 is pushed down which causes projection 14 to swing on hinge 18 and raise out of trap 15.

In some embodiments all of one side of fastener 11 (for instance all projections 14) are located on interior section 3 and all of the mating side (for instance all holes 13) are located on outer frame 2. In other embodiments some of each side of fastener 11 are located on both outer frame 2 and interior section 3. In most embodiments the fastener 11 found on interior section 3 mates with any desired fastener 11 on outer frame 2. This ability to for any interior section 3 fastener 11 to mate with any outer perimeter 2 fastener 11 beneficially allows any part of interior section 3, especially when interior section 3 is made out of a plurality of pieces, to be placed and efficiently mate with any part of outer frame 2.

Figure 5:
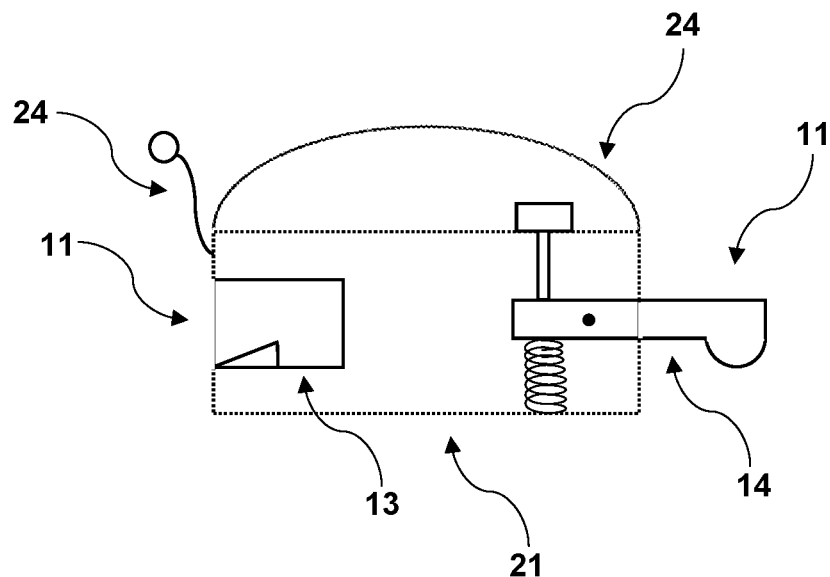
FIG. 5 shows a cross-sectional view of an interior section of the vehicle protector shown in FIG. 1.

In some embodiments where outer frame 2 contains multiple pieces, these pieces join together in outer frame seam 19. In some embodiments outer frame seam 19 is equipped with fastener 11. In some embodiments where interior section 3 contains multiple pieces, these pieces (21) join together in interior section seam 20. In some embodiments interior section seam 20 is equipped with fastener 11. In some of these embodiments, the side of fastener 11 alternates along parallel sides of piece 21, as shown in FIG. 5. These embodiments are useful as all pieces are easily swapped out with one another, and can all easily attach to one another or to outer frame 2. In other embodiments all sides of piece 21 contain the same side of fastener 11. These embodiments are useful for manufacturing as all one type of fastener end could be placed in all the edges of a given piece 21. In these embodiments a kit is provided which would contain pieces of 21 with all one side of fastener 11 as well as pieces with all the mating side of fastener 11. In other embodiments the same side of fastener 11 are on adjacent sides, an in other embodiments the same side of fastener 11 is on alternating sides.

In some embodiments, where there is only one interior section 3 is one piece, only outer perimeter 10 and inner perimeter 9 contain fastener 11, which connect outer frame 2 and interior section 3 at seam 22. In some embodiments where interior section 3 is multiple pieces, the outer perimeter of each piece 21 as well inner perimeter 9 contain fastener 11. In these embodiments, any piece 21 can connect to any fastener 11 along inner perimeter 9. In some embodiments vehicle protector 1 consists of outer frame 2 and a fully constructed interior section 3. These embodiments give the greatest protection and stability. In other embodiments vehicle protector 1 consists of outer frame 2 and a partially constructed interior section 3. An example of this embodiment can be seen in FIG. 3 which shows vehicle protector 1 with missing pieces 21 denoted by label 25. These embodiments are useful as bike racks, roof racks, and other devices which attach to the vehicle come in a variety of different shapes and sizes, and fit on vehicles in different ways, so having a vehicle protector 1 which is modular is important as it is necessary to change the construction of vehicle protector 1 based on these different scenarios.

In some embodiments fastener 11 covers the entire seam 19, 20, or 22. These embodiments are useful for fasteners such as hook and loop or magnetization whose connectivity benefits from large surface areas. In other embodiments fastener 11 only covers a portion of seams 19, 20, or 22. These embodiments are useful for fasteners such as projection and hole, which can be spaced out and still effectively connect the various pieces.

Figure 6:
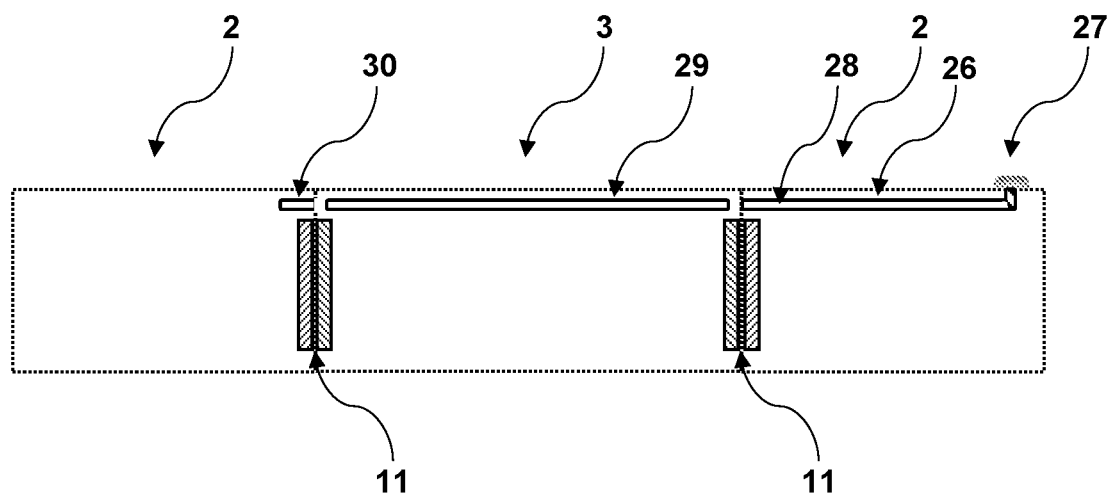
FIG. 6 shows another assembled cross-sectional view of the embodiment of the vehicle protector shown in FIG. 1.

In some embodiments with fastener 11 there is further provided a lock (26) which locks the pieces or and areas together. In some embodiments strap 4 is provided which is placed inside of the trunk or inside the car which prevents outer frame 2 from being able to be removed from the vehicle. In some embodiments strap 4 is made of a cut resistant material to give further protection. In some embodiments lock 26 is a deadbolt lock which is accessed by keyhole 27. FIG. 6 shows a cross-sectional view of vehicle protector 1 along line 12 which shows an example of this type of lock. When the key is turned within keyhole 27, deadbolt 28 in outer perimeter 2 is pressed into rod 29 within interior section 3 which in turn presses into hole 30 on the other side of outer perimeter 2 and secures all of the sections together. In some embodiments where outer perimeter 2 and interior section 3 are each one piece only one lock 26 is provided. In some embodiments where outer perimeter 2 or interior section 3 are more than one piece more than one lock 26 is provided as a means of locking together all of the pieces.

In some embodiments outer frame 2 is equipped with a fold line 23. These fold lines give a flexibility to outer frame 2 about the line which allows for easier storage of outer frame 2. In some embodiments only on fold line 23 is provided and in other embodiments multiple fold lines 23 are provided. In some embodiments interior section 3 is provided with fold line 23. In some embodiments only one fold 23 line is provided on interior section 3 and in other embodiments multiple fold lines 23 are provided. In some embodiments both interior section 3 and outer frame 2 are provided with one or more fold lines 23.

In some embodiments outer frame 2 is provided with removing aid 24, in some embodiments interior section 3 is provided with removing aid 24, and in other embodiments both outer frame 2 and interior section 3 are provided with removing aid 24. In some embodiments only one removing aid 24 is provided and in other embodiments multiple removing aids 24 are provided. Embodiments with only one removing aid 24 are useful when outer frame 2 or interior section 3 are one piece, and embodiments with multiple removing aids 24 are useful when outer frame 2 or interior section 3 are multiple pieces. Embodiments with only one removing aid 24 are also useful as once one piece is removed it is easier to access the other pieces from the hole created, thus only one removing aid 24 could be used which would reduce manufacturing costs.

FIG. 5 shows some examples of removing aid 24. In some embodiments removing aid 24 is a handle secured to piece 21 (or similar outer frame pieces) which helps lift piece 21 (or similar outer frame pieces) off from the vehicle. In other embodiments removing aid 24 is a tab secured to piece 21 (or similar outer frame pieces). In other embodiments, removing aid 24 is an extra piece of material secured to the bottom of piece 21 (or similar outer frame pieces) which is long enough to stick out between the pieces 21 when attached to the vehicle and can be pulled to remove piece 21 (or similar outer frame pieces) from the vehicle. In other embodiments an ejection spring is equipped near the bottom of piece 21 which, once activated, presses against the vehicle and lifts piece 21 off of the vehicle. In some embodiments the spring is activated by pushing a button on piece 21.

Figure 7:
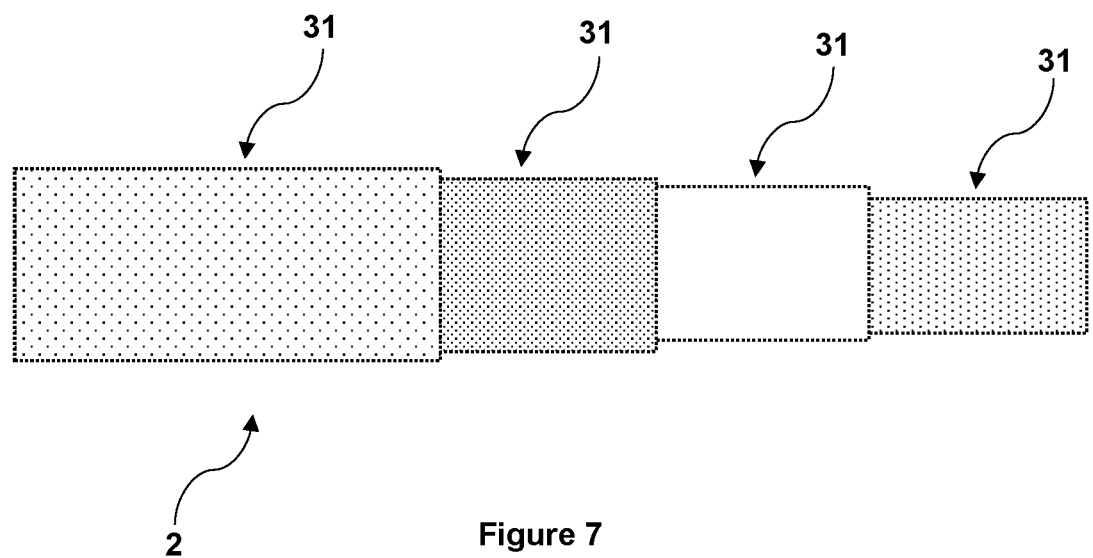
FIG. 7 shows an expanded view of the outer frame of the vehicle protector shown in FIG. 1.

In some embodiments outer frame 2 consists of telescopically engaged sections (31) which allow it to be extended, as seen in FIG. 7. These embodiments are useful when outer frame 2 is a single piece as it allows outer frame 2 to expand or contract based on the area which needs to be protected by vehicle protector 1. In some embodiments the telescopically engaged sections 31 are placed along the length, in other embodiments along the height, and in other embodiments on the corners. These embodiments allow outer frame 2 to expand lengthwise, height-wise, and diagonally, respectively. In some embodiments the telescopically engaged sections are provided along multiple dimensions.

In some embodiments the different interior section pieces 21 are all the same shape and in other embodiments they are different shapes. Embodiments where interior section pieces 21 are all the same shape are useful for ease of manufacturing and for ensuring all of the pieces will efficiently fit together. Embodiments where interior section pieces 21 are different shapes are useful as it allows the user to build vehicle protector 1 to cover whatever geometric area is desired. This is important as bike racks, roof racks, and other devices which attach to the vehicle come in a variety of different shapes and sizes, and fit on vehicles in different ways, so having a vehicle protector 1 which is modular is important in order to build vehicle protector 1 to match the given situation. Similarly, in some embodiments the different outer frame 2 pieces are all the same shape and in other embodiments they are different shapes. The shape of the vehicle protector 1 pieces are selected from the group consisting of circle, triangle, square, rectangle, pentagon, hexagon, heptagon, octagon, nonagon, decagon, and polygon.

In some embodiments the different interior section pieces 21 are all the same size and in other embodiments they are different sizes. Similar to the shapes discussed above, embodiments where interior section pieces 21 are all the same size are useful for ease of manufacturing and ensuring all of the pieces will efficiently fit together. Embodiments where interior section pieces 21 are different sizes are useful as it allows the user to build vehicle protector 1 to cover whatever area is desired. As above, in some embodiments the different outer frame 2 pieces are all the same size and in other embodiments they are different size.

In some embodiments the different interior section pieces 21 and outer frame 2 pieces are made of rigid materials which generally maintain their shape when average pressure from human hands is exerted upon them. In other embodiments these pieces are malleable and can be molded to a desired size or shape. Embodiments which are rigid are useful as they offer greater protection due to their rigid construction, but embodiments which are malleable are useful as they allow the user to shape vehicle protector 1 to cover whatever area is desired.

While the present invention has been particularly described, it is evident that many alternatives, modifications and variations will be apparent to those skilled in the art in light of the foregoing description. These descriptions and drawings are exemplary of specific embodiments only and are not intended to be limiting to the scope of the invention defined in the claims. It is therefore contemplated that the claims will embrace any such alternatives, modifications, and variations as falling within the true scope and spirit of the present invention.

What is claimed:

1. A vehicle protector comprising:
   an outer frame;
   wherein said outer frame further comprises an inner perimeter;
   an interior section comprised of at least one interior section piece;
   wherein said interior section further comprises an outer perimeter;
   wherein said outer perimeter of said interior section further comprises at least one interior section fastener;
   wherein said at least one interior section piece has a seam;
   wherein at least a portion of said seam comprises a fastener;
   wherein said inner perimeter of said outer frame further comprises at least one outer frame fastener which mates with said at least one interior section fastener;
   an outer surface;
   an inner surface;
   a magnetic layer located in between said outer surface and said inner surface;
   wherein said at least one interior section piece further comprises a removing aid;
   wherein said removing aid comprises a tab and a fabric;
   wherein a spring is connected to said removing aid.

2. The vehicle protector according to claim 1, wherein said at least one interior section fastener and said at least one outer frame fastener are selected from the group consisting of magnetization, hole and projection, groove and projection, hook and loop, and combinations thereof.

3. The vehicle protector according to claim 1, further comprising a bottom surface, and wherein said bottom surface comprises features selected from the group consisting of projections, corrugation, bumps, ridges, divots, and combinations thereof.

4. The vehicle protector according to claim 3, wherein said bottom surface further comprises at least one magnet located within said features.

5. The vehicle protector according to claim 1, further comprising a bottom surface, and wherein said bottom surface is a magnet.

6. The vehicle protector according to claim 1, wherein said outer frame further comprises at least one fold line.

* * * * *